US008644806B2

(12) United States Patent  
Comolatti

(10) Patent No.: US 8,644,806 B2  
(45) Date of Patent: Feb. 4, 2014

(54) SYSTEM AND METHOD FOR TELEPHONY USING INTERNET DOMAIN NAMES AND ELECTRONIC ADDRESSES

(75) Inventor: Athos Comolatti, São Paulo (BR)

(73) Assignee: Siter Smart Software LTDA, Sao paulo (BR)

( * ) Notice: Subject to any disclaimer, the term of this patent is extended or adjusted under 35 U.S.C. 154(b) by 0 days.

(21) Appl. No.: 13/520,483

(22) PCT Filed: Apr. 9, 2010

(86) PCT No.: PCT/BR2010/000122  
§ 371 (c)(1),  
(2), (4) Date: Jul. 3, 2012

(87) PCT Pub. No.: WO2011/123908  
PCT Pub. Date: Oct. 13, 2011

(65) Prior Publication Data  
US 2013/0045721 A1 Feb. 21, 2013

(51) Int. Cl.  
*H04M 3/42* (2006.01)

(52) U.S. Cl.  
USPC ............... 455/414.1; 455/414.4; 455/415; 455/417; 379/88.17; 379/218.01

(58) Field of Classification Search  
USPC ............... 379/88.17, 218.01; 455/414.1–417  
See application file for complete search history.

(56) References Cited

U.S. PATENT DOCUMENTS

| 6,788,769 | B1 | 9/2004 | Waites | |
| 7,382,871 | B1 * | 6/2008 | Ure | 379/218.01 |
| 2002/0029350 | A1 | 3/2002 | Cooper et al. | |
| 2006/0153162 | A1 * | 7/2006 | Croak et al. | 370/352 |
| 2008/0037729 | A1 * | 2/2008 | Mobin et al. | 379/88.17 |
| 2009/0109959 | A1 | 4/2009 | Elliott et al. | |
| 2009/0181651 | A1 * | 7/2009 | Klassen | 455/414.1 |

FOREIGN PATENT DOCUMENTS

| EP | 0952723 | 2/1999 |
| WO | 0205533 | 1/2002 |

* cited by examiner

*Primary Examiner* — Charles Appiah  
*Assistant Examiner* — Jaime Holliday  
(74) *Attorney, Agent, or Firm* — Stites & Harbison PLLC; Richard S. Myers, Jr.

(57) ABSTRACT

A Uniform Resource Locator (URL), or a portion thereof, or an e-mail address are employed as auxiliary indicators of dialing of a voice call from a mobile phone to an URL- or specific e-mail address-associated part, with the part originating the call not identifying the telephone number of the other part An automated conversion is performed from an URL, or a portion thereof, or e-mail address, for an intended telephone number, or multiple intended telephones, in response to requirements started at the telephone system by the caller A part with presence in the Internet achieves a better availability with the public by means of voice telephone calls, since the URL's and e-mail addresses are convenient, known by, and significant to the clients.

4 Claims, 3 Drawing Sheets

SYSTEM AND METHOD FOR TELEPHONY USING INTERNET DOMAIN NAMES AND ELECTRONIC ADDRESSES

The present invention refers to mobile telephony, and particularly to a system and method for telephony using Internet domain names and e-mail electronic addresses for completing a call.

DESCRIPTION OF THE PRIOR ART

Until recently, the existence and use of a URL for identifying a company or an institution was rare. The physical addresses and telephone numbers have been the most frequently used means for promoting and performing contact between companies and their final clients.

The decisive moment for the possibility of publishing domain names in the market was the introduction of DNS systems that translates the IP number (determining the server where the website is hosted) into a domain name. This is an alphanumeric domain, being easily remembered by the final users.

As many of the originally Internet-associated inventions, the origin of DNS is related to ARPANET. The alphabetically ordered hostnames were introduced immediately after its initiation, as a mean that provides a better functionality to the users, since the numeric addresses were shown to be hard to remember.

Originally, every website connected to ARPANET had a file called 'HOSTS.TXT' that, for its turn, had the mapping information of all the addresses used. Such information was shared by ARPANET.

Unfortunately, such aspect generated many issues. Errors were common and the alterations were ineffective, since they had to be done in each one of the copies of 'HOSTS.TXT' file. In December 1973, a RFC 606 proposal was introduced, named "Host Names On-line", which after a number of amendments, in 1974, RFC 625 was originated, granting Standford Network Information Center—NIC with the official license turning it the central site of hosting of the information on the name servers, system which was used for more than a decade. However, in the early 80's, the volume of dynamic data circulating in the web made necessary more than one source for storing and hosting all the information.

The host file was becoming excessively big and heavy. Many websites started to download complete files during the night, depleting the Standford Network Information Center resources. Something needed to be changed. In November 1983, a plan was elaborated in RFCs 881, 882, and 883, also referred to as "Domain Names Plan and Schedule", "Domain Names—Concepts and Facilities", and "Domain Names Implementation and Specification". These three RFCs became the currently known DNS.

The increasing of domain registrations worldwide occurred simultaneously with the introduction and development of mobile phones and telephone technology. One of the characteristics of the current models of mobile phones is the possibility of connection to Internet by means of Wi-Fi, Edge, 3G, and similar data webs.

Such connection enables the newly designed mobile phones to refer to database and websites available in the Internet.

In the current mobile telephony system, it is noted that the user should also dial the telephone number of the other part to complete a call using the mobile system.

Also, patent documents WO 02/05533 and EP 0 952 723 disclose systems not achieving the expected goals, as explained as follows.

The system object of this patent makes a direct call between the parts, not emphasizing the call-back connection as described in patent WO 02/05533; in addition, it is innovatively described how a domain or e-mail is used as an univocal indexing key for identifying the other part.

The system object of this patent does not describe a system of telephone directories, where searches would be performed, as in document EP 0 952 723. This patent describes a direct call, without any kind of search to be performed by who makes the call.

This patent aims at creating an auxiliary mean for making calls, without identifying the telephone number of the other part, but using a URL (domain) owned by the part to be called and Internet.

The applicant provided an automated system and method employing a Uniform Resource Locator—URL, or a portion thereof, or an e-mail electronic address, for determining the telephone number of the other part being called.

BRIEF DESCRIPTION OF THE INVENTION

A Uniform Resource Locator (URL), or a portion thereof, or an e-mail electronic address is employed as an indicator for making a voice call from a mobile phone to a part associated to such URL or e-mail electronic address, without identifying the telephone number of the other part. A URL automated conversion, or a portion thereof, Or an e-mail electronic address, for a specific telephone number in response to the requirements initiated in the telephonic system from the caller. The presence in the Internet provides a high availability to the public by means of mobile phone voice calls since the URL names and e-mail electronic addresses are convenient, known by, and significant to the clients.

The system and method receive a requirement when it is originated from a mobile phone, and the system and method refer to a local database, where the address owner may have inserted a contact telephone to be used.

If no telephone number is inserted by the URL owner in the local database, then the system automatically tries to identify a telephone number to be used, referring to: public database containing information on telephone directories or visiting the website itself, and analyzes the HTML in order to identify the telephone number of the part being called.

The present invention has the advantage of enabling a voice telephonic call to be made for an entity with presence in the Internet (having a domain name or e-mail), when the part making the call does not identify the telephone number of the part being called.

The call requirement is initiated by means of an application running in the mobile phone from who makes the call, the part making the call provides the URL, or a portion thereof, or e-mail from the other part, which is to be called.

The invention receives and processes the requirement. Optionally, the invention can take into consideration the current place of the part making the call, the location of the part being called, list of permitted telephone numbers, list of blocked telephone numbers, working hours, or other preferences determined by the part being called, so as to the chosen intended telephone number to be the most effective. In addition, the time and date of the call from the caller, as well as the time and date from the intended telephone number, can also be taken into consideration. The requirements made and stored by the domain name owner for determining which telephone number should be called can be programmed to occur on the date and time to be designated or can be immediately made.

According to the invention, after the telephone number from the part being called is identified, the invention can directly provide such number to the mobile phone from who is making the call and require the call to be made. Optionally, the invention can require a telecommunication company to make a contact between the mobile phone making the call and the mobile phone from the other part. Such contact can occur by means of a call-back system, originated by any of the parts, or by means of a SMS response with the telephone number from the other part, or by any other mean that the telecommunication company considers to be the most efficient and easy mean for connecting the parts.

The publishing and increasing of the availability of the domain registrations and the use of mobile phones that can access Internet make the adoption of the method and system described in the present invention easier. The comprehensive adoption of these technologies by the market generated a critical mass over the technological, cultural, and economical aspects enabling the creation of dissemination of the present invention.

The object of the present invention is a system used for establishing a telephonic call with another part using Internet information from the other part only, comprising: means for inserting Internet information of a caller in a mobile phone; a telephone numbers local database, with each telephone number being associated to the corresponding Internet information, and if the local database contact telephone is unavailable, means for searching the Internet information-associated contact telephone by means of public and Internet-accessible information.

BRIEF DESCRIPTION OF THE DRAWINGS

The present invention will be more briefly described as follows based on a performance example represented in the drawings. The figures show.

DETAILED DESCRIPTION OF THE INVENTION

Figure 1:
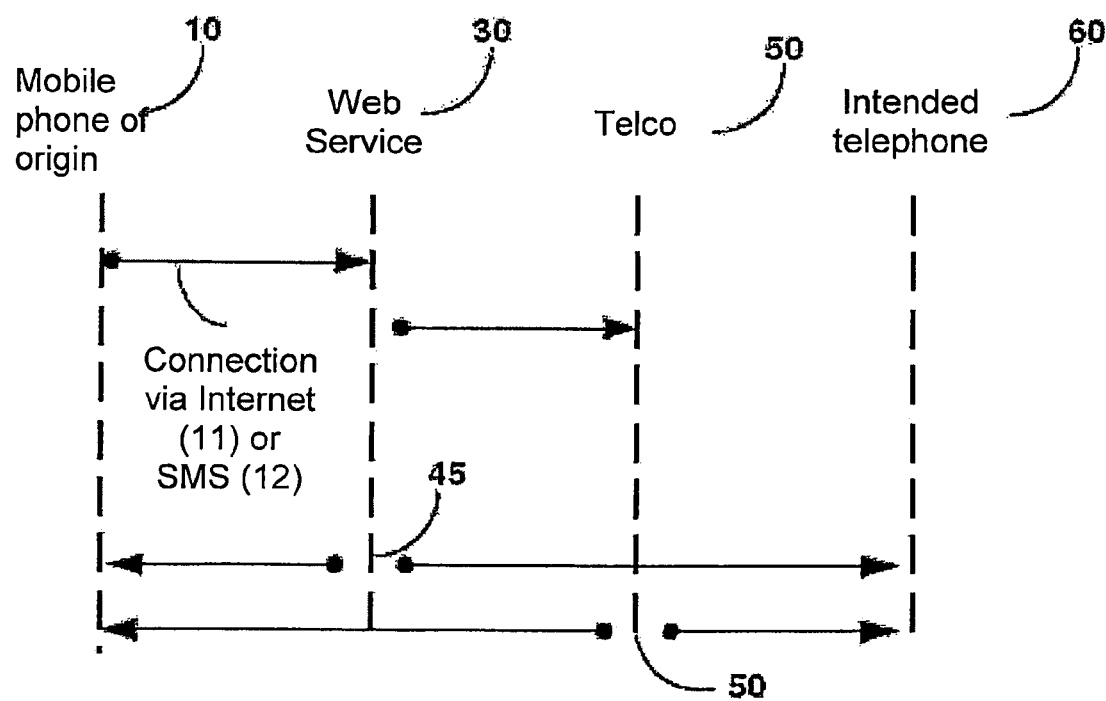
FIG. 1 is a schematic picture of the system of the present invention where the main components are showed.
Figure 2:
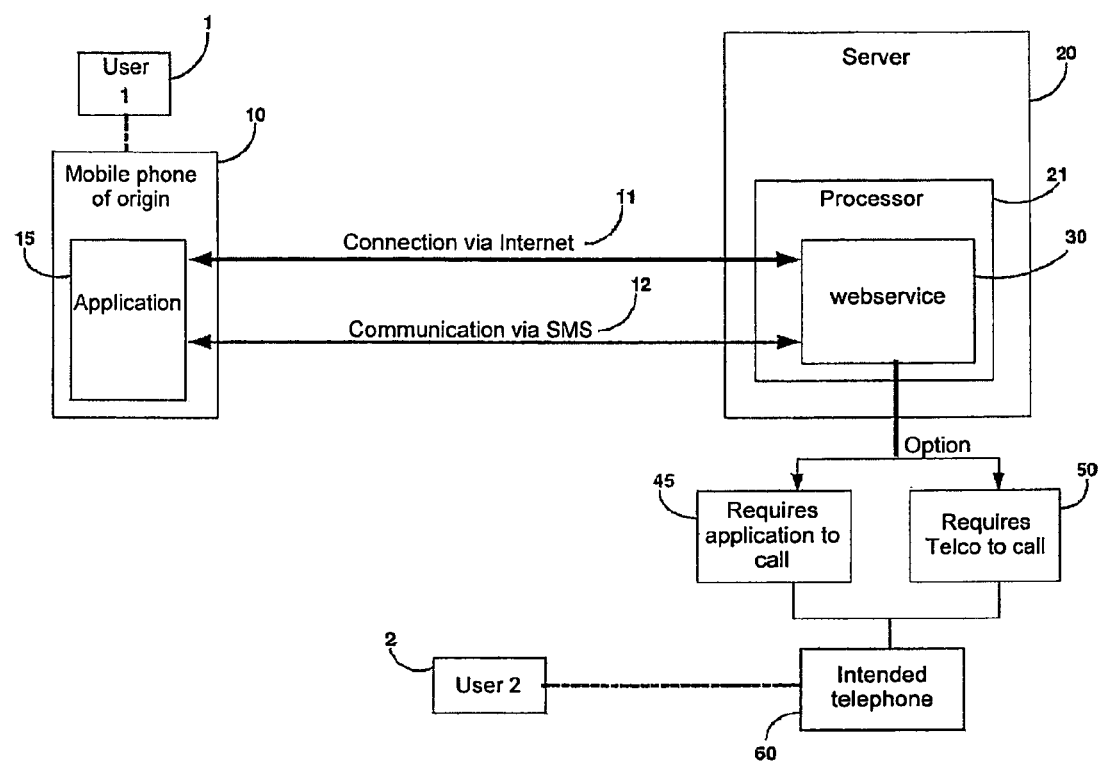
FIG. 2 is a simplified flowchart illustrating interactions of the main components of FIG. 1.
Figure 3:
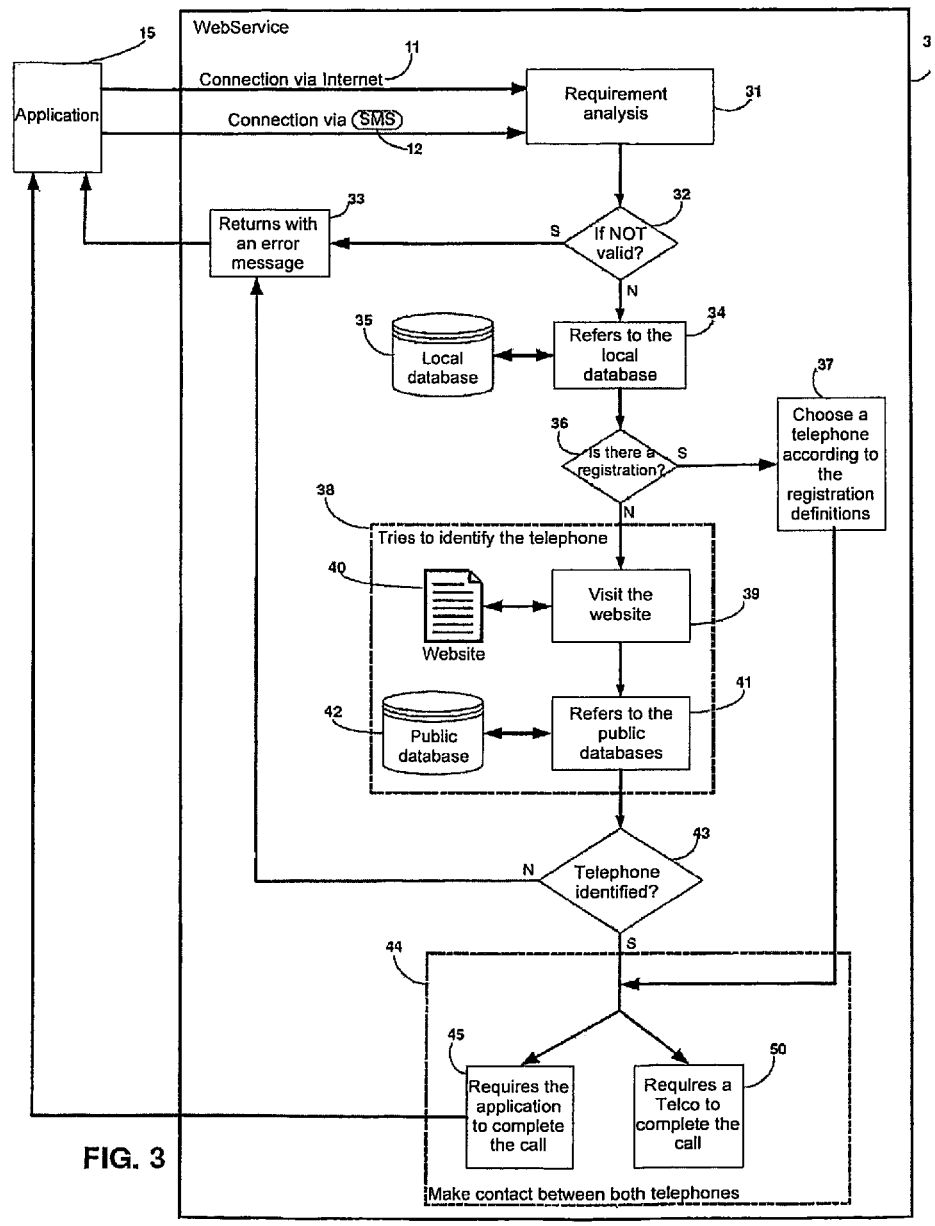
FIG. 3 is a scheme illustrating the consultation and definition process of the telephone number to be called aiming at performing the telephonic connection between the parts.

With reference to FIGS. 1 to 3, the system and method of the present invention employ a Uniform Resource Locator (URL), or a portion thereof, or an e-mail, associated to the other part, as an indicator for making a voice call.

As used in this document, the following expressions are defined as indicated:

Telephone Number Area Code

These are the codes of the country and city of a telephonic number.

Arpanet

The long distance web—(Advanced Research Projects Agency Network ARPANET) developed by the Advanced Research Projects Agency—ARPA of the United States Department of Defense was the first worldwide packet commutation operational web, originating global Internet.

Country Code Top-Level Domain (CCTLD)

The domain extensions with country codes represent a specific country, always with 2 digits, for example: .BR for Brazil, .JP for Japan, .FR for France, and so on.

Telephone Number Country Code

The country codes are geographic codes with short numbering (geo-codes) developed for representing countries and dependent areas, for use in data processing and communication. The expression country code frequently refers to international dialing codes, system E.164 of country calling codes, for example: Brazil's code is 55.

DNS

The Domain Name System—DNS translates the domain names into the IP addresses. The DNS also lists electronic mail interchange servers.

Domain Name

Domain names are names that are easy to remember for representing the IP numeric addresses, and are used as names of websites or e-mail base addresses, for example: www.microsoft.com.

Telephone Number Mapping—ENUM

The Telephone Number Mapping—ENUM unifies the traditional telephony and the newly designed IP webs, in addition of providing a primordial structure for the mapping and processing of different addresses of the web.

ENUM transforms the telephone number into a domain.

General Top Level Domain—GTLD

A general top level domain consists in domains created and used worldwide. They are characterized as having 3 or more digits. There are a number of categories, among which:

.aero—for the air transport sector
.biz—for business use
.cat—for Catalan language/culture
.com—for business companies, but limitless
.coop—for cooperatives
.edu—for higher education institutions
.gov—for governments and their agencies in the United States
.info—for information websites, but limitless
.int for international organizations established by treaty
.jobs—for matters related to work
.mil—for soldiers of the United States
.mobi—for websites related to mobile devices
.museum—for museums
.name—for families and individuals
.com—business companies in general
.net—originally for infra-structures of the web, currently limitless
.org—originally for organizations that do not clearly fit within the others GTLDs.
.pro—for certain occupations
.travel—for traveling agents, hotel owners, tourism offices, etc.

GPS

Currently, the Global Positioning System—GPS is the only navigation system that completely operates via satellite. More than two dozens of satellites are in the medium earth orbit, transmitting signs and enabling the receivers of GPS to determine location, velocity, and direction.

IP Addresses

An Internet Protocol—IP address is a single address used by the devices for identifying and communicating in a computer web using the standard Internet protocol, or in a simplified way, a computer address. Any device of the web, including routers, computers, time-servers, printers, Internet facsimile machine, and some telephones, can be their own IP addresses.

RFC

In the web and Internet computer engineering, the Request for Comments—RFC documents consist in a series of memorandums that comprehend new researches, innovations, and methodologies applicable to the Internet technologies. By means of the Internet society, computer engineers and scientists can publish discourses in the form of a RFC memorandum, either for analysis of colleagues or for simple transmission of concepts and information. The Internet Engineering Task Force—IETF adopts some of the proposals published in the RFCs as Internet standards.

Top Level Domain—TLD

The top level domain is the last portion of the Internet domain name; i.e., the letters following the full stop of any domain name. In the domain name, for example, the top level domain is .com. The Internet Assigned Numbers Authority—IANA currently classifies the top level domains in three types:

A. The ccTLD, i.e., the country code top level domains: used by a country or a dependent territory. Two letters compose them, for example, jp for designating Japan.

B. The gTLD, i.e., the general top level domains: used by a particular kind of organizations, for example, .com for business organizations. Three or more letters compose them. The majority of the GTLD is worldwide available for use, but, due to military and governmental historical reasons these general domains are restrictedly used by the respective United States authorities. The gTLD are sub-classified in sponsored top-level domains sTLD, i.e., .aero, .coop, and .museu, and unsponsored top-level domains uTLD, i.e., .biz, .info, .name, and .pro; and C. The infra-structure top level domain: the top level domain .arpa is the only one confirmed. The main name is known, but without a reason for such.

PSTN

The Public Switched Telephone Network—PSTN is a worldwide public web of telephone webs, in the same way that Internet is the worldwide IP addresses public web. Originally, a stable line web of telephony analogical systems, PSTN is currently almost completely digital and includes cordless telephones. PSTN follows technical standards created by ITU-T, and uses addresses E.163/E.164 (commonly known as telephone numbers) for addressing.

Roaming

Roaming is a general expression for wireless telecommunication that refers to the extension of the connection service at a place different from the original location where the service was registered. Roaming occurs when a wireless service dialer subscriber uses the installations of another wireless service dialer.

SMS

The short message service (SMS) is a service available in the majority of digital mobile phones, and other mobile devices, for example, the pocket-sized PC, or occasionally even a tablet computer, that enables the sending of short messages, also known as text messages, or in colloquial language, the SMSs, texts, or even txts, between mobile phones, other mobile devices, and even cordless telephones.

SMS Center

A SMS center—SMSC is in charge of the administration of SMS operations of a wireless web. When a SMS is sent from a mobile phone, it will first be sent to the SMS center. The SMS center then forwards the SMS to its destination. A SMS may be sent to more than one web entity (for example, SMSC and SMS gateway) before being sent to its destination.

VOIP

The voice signs in an IP web (Voice over Internet Protocol—VOIP), also called VoIP, IP Telephony, Internet Telephony, broadband telephony, broadband telephone, and broadband voice is the route of the Internet voice conversations or by means of other Internet Protocol-based web.

Telco

Telco is a general expression for one or more telecommunication companies.

URL

The Uniform Resource Locator—URL is the address for a source or website (commonly a directory or file) in the Worldwide Web and the convention that Web browsers use for locating files and other remote services.

Webservice

Webservice is a solution used for integrating systems and used in the communication between different applications. With such technology, it is possible to the new applications to interact with the already existing ones and the systems developed in different platforms to be compatible. The webservice receives and processes requirements arising from other systems.

System and Method of the Invention

As shown in FIGS. 1 to 3, the method of the invention aims at establishing a voice connection via telephone between the mobile phone of origin and the intended telephone, whether mobile phones, cordless telephones, ENUM or VOIP connection, with the user making the call not previously identifying the telephonic number for which he/she will call.

With reference to FIG. 1, the system of the present invention has a first user 1 using a mobile phone of origin 10 for establishing and making telephonic calls.

The first user 1 provides the Internet information, such as a URL or a portion thereof, or an e-mail address, of a second user 2 by means of an application 15 for mobile phones, aiming at establishing a telephonic call with such second user.

The application 15 generates and transmits message with the requirement for the webservice 30 that will process the requirement. The requirement may be transmitted via Internet connection 11 or by means of a SMS 12.

The application 15 may use any of the currently known technologies for enabling the typing of the URL, or a portion thereof, or e-mail address to be contacted, for example, but not limited to: alphanumeric keyboard of the mobile phone itself, digital alphanumeric keyboard showed in a touch screen device, or a voice recognition system.

The computer system 20 refers to one or a set of web servers, capable of processing the requirements arising from application 15. The computer system 20 includes one or a number of processors 21 for running the pre-determined software 30 of the present invention for performing the innumerous functions and characteristics of the present invention, as described in this document. The computer system 20 also has a local database 35, in which the URL's or e-mails owners can register their contact telephones.

When the webservice system 30 receives a requirement via Internet 11 or via SMS 12 it performs an initial analysis of requirement 31, aiming at checking if the requirement is valid.

If the requirement format or content is invalid, an error message 33 will be sent to the application 15 for informing user 1.

If the requirement is valid, webservice 30 will check if the URL or e-mail owner has registered his/her contact telephones in the local database 35. The registration of the contact telephones in the local database 35 may have a number of different options of registration with the purpose of enabling user 2, URL or e-mail owner, to define which are the best telephonic numbers to be used. The optional ways of registration of contact telephones in the local database 35 are, but not limited to:

a—Insertion of telephone directories for the same URL or e-mail. Such option enables multiple telephones to be inserted for the same URL or e-mail. Such option may be used for insertion of extension lines, offices, or other applications where a number of telephones are associated under the same URL or e-mail.

b—Insertion of telephone directory with the respective addresses or the respective latitudes and longitudes. Such option enables multiple telephone numbers to be inserted for the same URL or e-mail, with the choice of the best telephone to be returned being the nearest to the current latitude and longitude of user 1.

c—Insertion of telephones with validity date and time. Such option enables the inserted telephones to be active or inactive according to the defined time and/or date settings. Such option may be used for example, for insertion of active telephones exclusively during weekends or holidays.

d—Insertion of telephones with a comprehension defined according to the earth regions. Such option enables the inserted telephones to be active or inactive if user 1 is physically within a defined area. Such option may be used for example, for insertion of active telephones exclusively when user 1 is in a determined state or country.

e—Insertion of telephones defined by the kind of connection between application 15 and webservice 30, for example: SMS and Internet, capable of making VOIP calls or not. Such option may be used for example, for determining that a contact telephone of user 2 would be active or inactive in the local database 35 only if mobile phone 1 could have access to Internet and make calls via VOIP.

The URL owner, user 2, may define which options or which set of options better represents his/her contact telephones at the insertion of his/her telephones in the local data base 35. Webservice system 30 will define which are the best contact telephones 37, according to the definitions provided.

If there is no contact telephone information for the URL or e-mail provided in the local database 35, then webservice system 30 will try to define a contact telephone 38, trough a number of means, among them:

a—In case a URL is provided, webservice system 30 will visit such URL trough web 39, and will try to determine the contact telephone in website 40 by analyzing the current content.

b—The attempt to identify a contact telephone 38 includes consultations 41 to public databases 42 having information to make associations between the URL or e-mail and any contact telephone.

The attempt to identify a contact telephone 38 includes the possibility of using one of the above-described options, or a combination thereof. If no contact telephone is identified, an error message 33 will be sent to application 15.

If one or more contact telephones are identified 38 or if there are active telephones in the local database 35, then webservice system 30 will try to make contact between user 1 making the requirement, and user 2. The system can make contact between them by means of one of the below-described methods:

a—Webservice system 30 may provide application with the telephonic number to be called and requires 45 application 15 to complete the call between user 1 and user 2.

b—Webservice system 30 can require a telecommunication company (TELCO) 50 to make the telephonic call between user 1 making the requirement, and user 2.

TELCO may use a number of options to make contact between both users, for example: Telephonic call via Callback for user 1.

c—Webservice system 30 may send a SMS to the mobile phone of origin 10 with the telephonic number of user 2 to be called.

The above-described communication options "a—" and "b—" may be performed through a VOIP connection, or through a regular telephonic call.

It will be certainly noted that while the above invention has been described in terms of illustrative example of the present invention, all the other changes and variations applied to the present invention in a way apparent to those skilled in the art are considered within the ample scope and extent of the present invention according to the following claims.

The invention claimed is:

1. A system for establishing a telephone call with an other part using Internet information from the other part, comprising:

a means for inserting Internet information of a caller in a mobile phone; and a local telephone number database with each telephone number being associated to the corresponding Internet information or a means for searching the Internet information-associated contact telephone with public and Internet-accessible information; wherein the Internet information has a Uniform Resource Locator (URL), and the URL is used to establish the telephone call, and a response from a consultation of the local telephone number database or means for searching the Internet information-associated contact telephone will have multiple possible contact telephones arranged according to the smallest current distance between who makes the call and the telephone address that is called.

2. The system as claimed in claim 1, wherein activation/deactivation of the contact telephones occurs as a function of a defined date and time.

3. The system as claimed in claim 1, wherein activation/deactivation of the contact telephones occurs as a function of the current region (State/Country) where a requiring part is located.

4. The system as claimed in claim 1, wherein activation/deactivation of the contact telephones occurs as a function of the type of connection between an application running in the mobile phone from a part making the call and a system receiving such requirement.

* * * * *